(12) United States Patent
Leeson et al.

(10) Patent No.: US 11,899,247 B2
(45) Date of Patent: Feb. 13, 2024

(54) SHROUD FOR OPTICAL CONNECTORS

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/857,915

(22) Filed: Jul. 5, 2022

(65) Prior Publication Data

US 2022/0334322 A1 Oct. 20, 2022

Related U.S. Application Data

(63) Continuation of application No. 16/990,824, filed on Aug. 11, 2020, now Pat. No. 11,378,754, which is a continuation of application No. 16/182,602, filed on Nov. 6, 2018, now Pat. No. 10,739,526.

(60) Provisional application No. 62/582,180, filed on Nov. 6, 2017.

(51) Int. Cl.
*G02B 6/38* (2006.01)
*G02B 6/24* (2006.01)

(52) U.S. Cl.
CPC .......... *G02B 6/3825* (2013.01); *G02B 6/241* (2013.01); *G02B 6/3831* (2013.01); *G02B 6/3879* (2013.01); *G02B 6/3893* (2013.01); *G02B 6/3897* (2013.01)

(58) Field of Classification Search
CPC .... G02B 6/3825; G02B 6/3831; G02B 6/241; G02B 6/3893; G02B 6/3897; G02B 6/3879
See application file for complete search history.

(56) References Cited

U.S. PATENT DOCUMENTS

| 9,733,436 | B2* | 8/2017 | Van Baelen | ........... G02B 6/387 |
| 10,739,526 | B2* | 8/2020 | Leeson | ................ G02B 6/3831 |
| 2004/0264873 | A1 | 12/2004 | Smith et al. | |

FOREIGN PATENT DOCUMENTS

| EP | 0927899 A1 | 7/1999 |
| WO | 2016024014 A1 | 2/2016 |

OTHER PUBLICATIONS

International Preliminary Report on Patentability dated May 12, 2020 in corresponding International Application No. PCT/IB2018/001415, 6 pages.

(Continued)

*Primary Examiner* — John Bedtelyon
(74) *Attorney, Agent, or Firm* — MH2 TECHNOLOGY LAW GROUP LLP

(57) ABSTRACT

A shroud includes a first end portion configured to slidably receive a bulkhead adapter and a second end portion configured to slidably receive an optical fiber connector. The first end portion includes an inner surface having ribs configured to engage the bulkhead adapter in an interference fit relationship, the second end portion includes an inner surface having ribs configured to engage the optical fiber connector in an interference fit relationship, and the shroud permits the optical fiber connector to be coupled directly with the bulkhead adapter in a push/pull engagement/disengagement relationship.

17 Claims, 8 Drawing Sheets

(56) References Cited

OTHER PUBLICATIONS

Search Report dated Apr. 15, 2019 in corresponding International Application No. PCT/IB2018/001415, 4 pages.
Written Opinion dated Apr. 15, 2019 in corresponding International Application No. PCT/IB2018/001415, 5 pages.

* cited by examiner

SHROUD FOR OPTICAL CONNECTORS

CROSS-REFERENCE TO RELATED APPLICATIONS

This is a continuation of U.S. Nonprovisional application Ser. No. 16/990,824, filed Aug. 11, 2020, pending, which is a continuation of U.S. Nonprovisional application Ser. No. 16/182,602, filed on Nov. 6, 2018, now U.S. Pat. No. 10,739,526, which claims the benefit of U.S. Provisional Application No. 62/582,180, filed Nov. 6, 2017, the disclosures of which are hereby incorporated by reference herein in their entireties.

BACKGROUND

The present disclosure relates to optical fiber connectors. More particularly, the disclosure is directed to a shroud for an optical fiber connector.

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating, and are approximately square in cross-section and with a ceramic ferrule at the termination of the optical fiber cable, surrounded by a plastic housing for protection. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by first pulling back an outer housing, which is slidable relative to the inner housing, to disengage a latch inside socket between the socket and the inner housing, before pulling the optical fiber connector from the socket. Until the latch is thus disengaged, the latch prevents withdrawal of the connector when the optical fiber cable is pulled in a direction away from the socket.

As understood by persons skilled in the art, Telcordia maintains various product specifications for the telecom market. Regarding single-mode optical connectors, Telcordia GR-326 provides a performance specification for cable assemblies. Users of patchcords and cable assemblies frequently use GR-326 to specify basic performance requirements for connectors and connectorized cable assembly products.

Some conventional cables that are terminated with an SC connector may be made from a rigid polymer, which transfers a load applied to the end of a cable to the ceramic ferrule at the end of the SC connector, thereby resulting in insertion loss. Telcordia GR-326 requires a maximum insertion loss of 0.5 dB when a 1.0 kg, a 1.5 kg, and a 2.0 kg load are applied to the end of the cable.

It may be desirable to provide a shroud to interface between an SC connector and a bulkhead adapter to which the SC connector is coupled in order to reduce insertion loss when a load is applied to the end of the cable. As such, a shroud according to the present disclosure may provide a firmer, more solid connection that prevents movement of the SC connector when an applied load is attached to the end of the cable, thereby reducing insertion loss. It may also be desirable to provide a shroud that does not alter the connection between the SC connector and bulkhead adapter.

SUMMARY

According to various aspects of the disclosure, a shroud includes a first end portion configured to slidingly receive a bulkhead adapter and a second end portion configured to slidingly receive an SC connector. The first end portion is configured to include an inner surface having ribs configured to engage an outer surface of the bulkhead adapter in an interference fit relationship, the second end portion is configured to include an inner surface having ribs configured to engage an outer surface of the SC connector in an interference fit relationship, dimensions of the inner surface of the first end portion are greater than corresponding dimensions of the inner surface of the second end portion, the shroud is configured to include an inner shoulder at an interface between the inner surface of the first end portion and the inner surface of the second end portion, the inner shoulder is configured to limit a depth of insertion of the bulkhead adapter into the first end portion of the shroud, a top wall of the inner surface of the second end portion of the shroud is configured to include a notch that extends a length of the second end portion, notch being configured to receive and permit passage of a protrusion extending from an outer surface of a top wall of the SC connector, the shroud is configured to permit the SC connector to be coupled directly with the bulkhead adapter in a push/pull engagement/disengagement relationship, and the shroud is configured to provide a connection between the SC connector and the bulkhead adapter that reduces insertion loss when a load is applied to an end of the cable at a boot end of the SC connector.

According to various aspects, a shroud includes a first end portion configured to slidingly receive a bulkhead adapter and engage an outer surface of the bulkhead adapter in an interference fit relationship and a second end portion configured to slidingly receive an SC connector and engage an outer surface of the SC connector in an interference fit relationship. The shroud is configured to include an inner shoulder configured to limit a depth of insertion of the bulkhead adapter into the first end portion of the shroud, the shroud is configured to permit the SC connector to be coupled directly with the bulkhead adapter in a push/pull engagement/disengagement relationship, and the shroud is configured to provide a connection between the SC connector and the bulkhead adapter that reduces insertion loss when a load is applied to an end of the cable at a boot end of the SC connector.

In some aspects, the first end portion is configured to include an inner surface having ribs configured to engage the outer surface of the bulkhead adapter in the interference fit relationship, and the second end portion is configured to include an inner surface having ribs configured to engage the outer surface of the SC connector in the interference fit relationship.

According to various aspects, dimensions of an inner surface of the first end portion are greater than corresponding dimensions of an inner surface of the second end portion, walls extend from the inner surface of the first end portion to the inner surface of the second end portion define an inner shoulder, and the inner shoulder is configured to limit a depth of insertion of the bulkhead adapter into the first end portion of the shroud.

In various aspects, the inner shoulder is at an interface between the inner surface of the first end portion and the inner surface of the second end portion.

In some aspects, a top wall of the inner surface of the second end portion of the shroud is configured to include a notch that extends a length of the second end portion, notch being configured to receive and permit passage of a protrusion extending from an outer surface of a top wall of the SC connector.

According to some aspects, the shroud provides an insertion loss of less than 0.5 dB when at least a 1.0 kg load is applied to the end of the cable.

In some aspects, the shroud provides an insertion loss of less than 0.5 dB when a 2.0 kg load is applied to the end of the cable.

According to various aspects, the shroud provides a firm connection between the SC connector and the bulkhead adapter that is more firm that a connection between the SC connector and the bulkhead adapter in the absence of the shroud.

In accordance with some aspects, a shroud includes a first end portion configured to slidingly receive a bulkhead adapter and a second end portion configured to slidingly receive an SC connector. The first end portion includes an inner surface configured to engage the bulkhead adapter in an interference fit relationship, the second end portion includes an inner surface configured to engage the SC connector in an interference fit relationship, and the shroud permits the SC connector to be coupled directly with the bulkhead adapter in a push/pull engagement/disengagement relationship.

In some aspects, the first end portion is configured to include an inner surface having ribs configured to engage the outer surface of the bulkhead adapter in the interference fit relationship, and the second end portion is configured to include an inner surface having ribs configured to engage the outer surface of the SC connector in the interference fit relationship.

According to various aspects, dimensions of an inner surface of the first end portion are greater than corresponding dimensions of an inner surface of the second end portion, walls extend from the inner surface of the first end portion to the inner surface of the second end portion define an inner shoulder, and the inner shoulder is configured to limit a depth of insertion of the bulkhead adapter into the first end portion of the shroud.

In various aspects, the inner shoulder is at an interface between the inner surface of the first end portion and the inner surface of the second end portion.

In some aspects, a top wall of the inner surface of the second end portion of the shroud is configured to include a notch that extends a length of the second end portion, notch being configured to receive and permit passage of a protrusion extending from an outer surface of a top wall of the SC connector.

According to some aspects, the shroud provides an insertion loss of less than 0.5 dB when at least a 1.0 kg load is applied to the end of the cable.

In some aspects, the shroud provides an insertion loss of less than 0.5 dB when a 2.0 kg load is applied to the end of the cable.

According to various aspects, the shroud provides a firm connection between the SC connector and the bulkhead adapter that is more firm that a connection between the SC connector and the bulkhead adapter in the absence of the shroud.

BRIEF DESCRIPTION OF THE DRAWINGS

Embodiments of the invention will now be further described, by way of example only, and with reference to the accompanying drawings, in which.

DETAILED DESCRIPTION OF EMBODIMENTS

Figure 1:
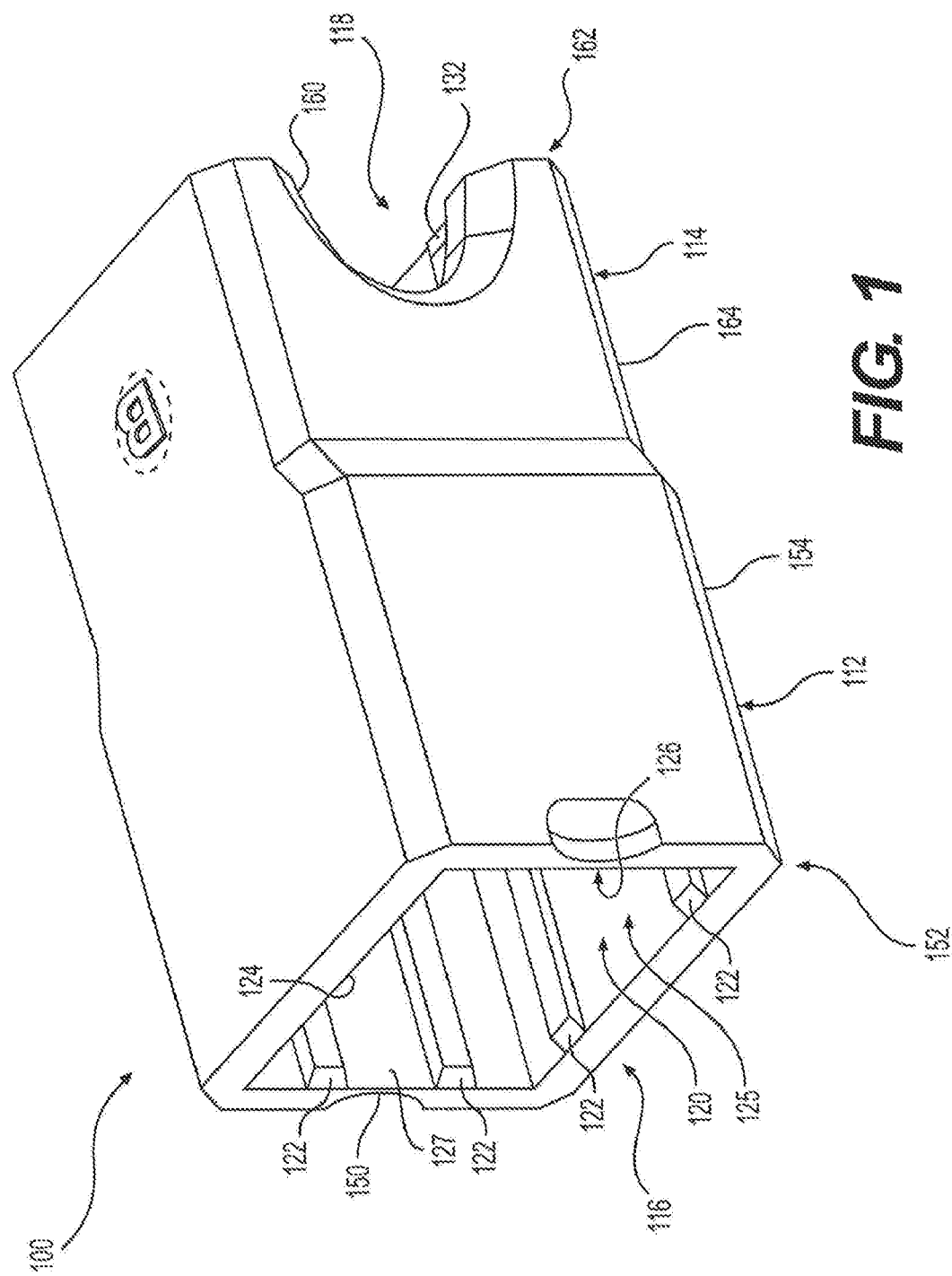
FIG. 1 is a perspective view of an exemplary shroud in accordance with various aspects of the disclosure.
Figure 2:
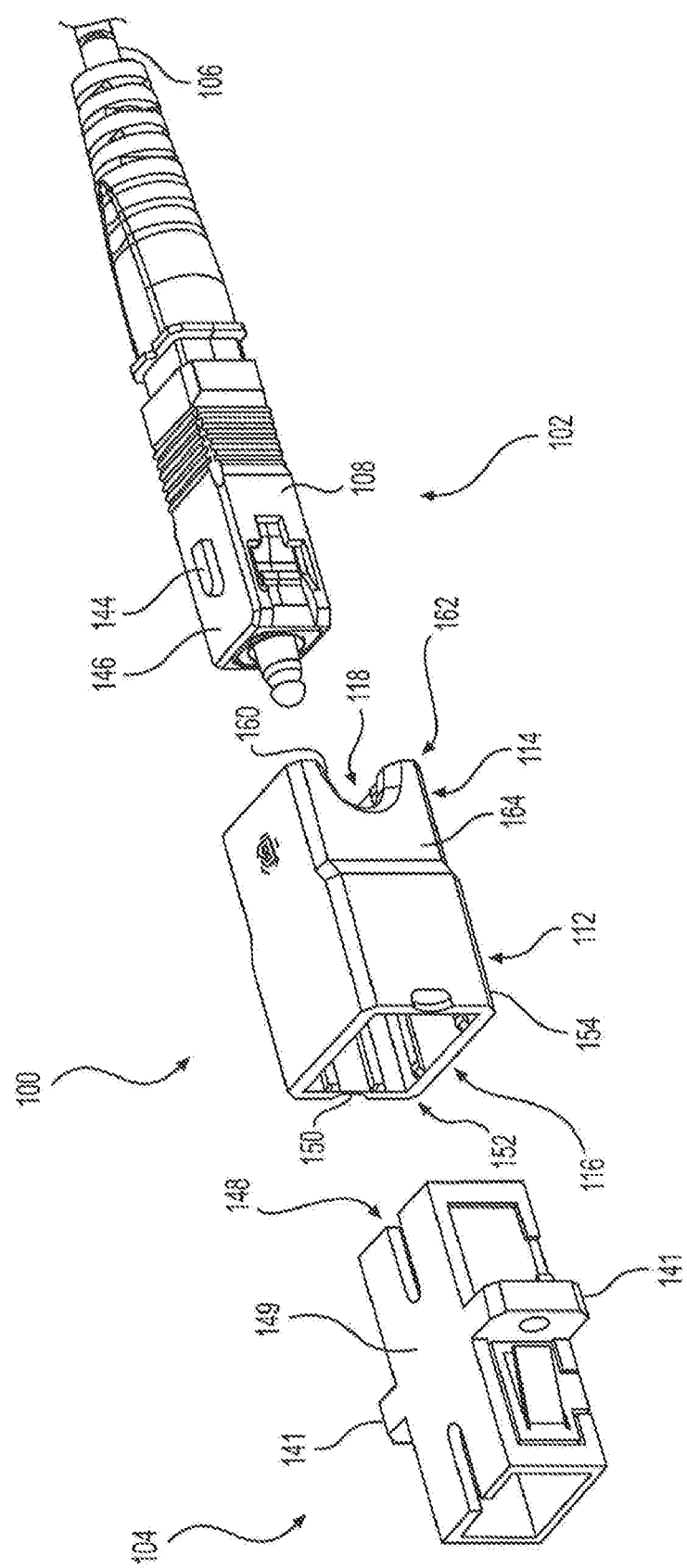
FIG. 2 is a perspective view of the exemplary shroud of FIG. 1, an exemplary bulkhead adapter, and an exemplary SC connector terminating an optical fiber cable.

FIGS. 1-4H illustrate an exemplary shroud 100 for use with an SC connector 102 and a bulkhead adapter 104. In some aspects, the bulkhead adapter 104 may be a SENKO SC adapter, and the SC connector 102 may be a PPC® SC connector. The exemplary SC connector 102 terminates an optical fiber cable 106 and includes an outer housing 108 to provide SC-style push/pull engagement/disengagement with a mating optical fiber socket of the bulkhead adapter 104.

According to the exemplary embodiment illustrated in FIGS. 1-4H, the shroud 100 may be a single monolithic piece of unitary construction.

The shroud 100 has a first end portion 112 and a second end portion 114 in an axial direction X of the shroud 100. The first end portion 112 includes an opening 116 configured to receive the bulkhead adapter 104, and the second end portion 114 includes an opening 118 configured to receive the SC connector 102. The first end portion 112 includes an inner surface 120 with ribs 122 extending inward from each of the top, bottom, and side walls 124, 125, 126, 127 of the inner surface 120 in a direction transverse to the axial direction. Similarly, the second end portion 114 includes an inner surface 130 with ribs 132 extending inward from each of the top, bottom, and side walls 134, 135, 136, 137 of the inner surface 130 in a direction transverse to the axial direction.

It should be appreciated that the dimensions of the inner surface 120 of the first end portion 112 are greater than the corresponding dimensions of the inner surface 130 of the second end portion 114. That is, a distance from side wall 126 to side wall 127 is greater than a distance from side wall 136 to side wall 137, and a distance from top wall 124 to bottom wall 125 is greater than a distance from top wall 134 to bottom wall 135. Further, the ribs 122 extend from the inner surface 120 of the first end portion 112 by a distance that defines an opening sized to provide an interference fit relationship between the ribs 122 and the outer surface 105 of the bulkhead adapter 104. Meanwhile, the ribs 132 extend from the inner surface 130 of the second end portion 114 by a distance that defines an opening sized to provide an interference fit relationship between the ribs 132 and the outer surface 103 of the SC connector 102.

Figure 4A:
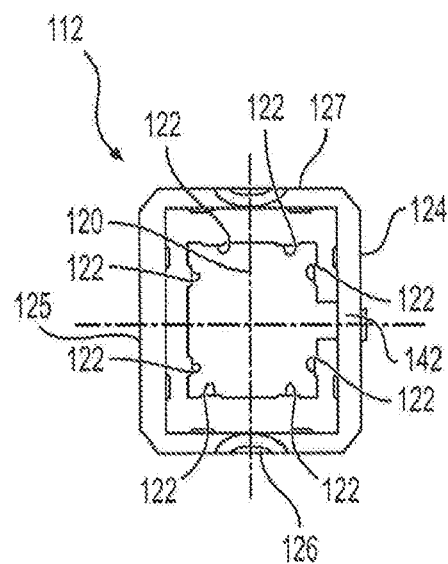
FIG. 4A is a first end view of the exemplary shroud of FIG. 1.
Figure 4B:
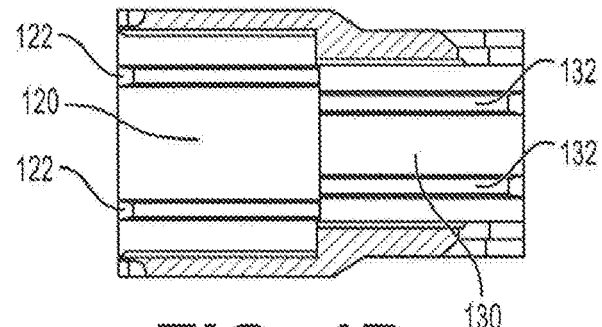
FIG. 4B is a top cross-sectional view of the exemplary shroud of FIG. 1.
Figure 4C:
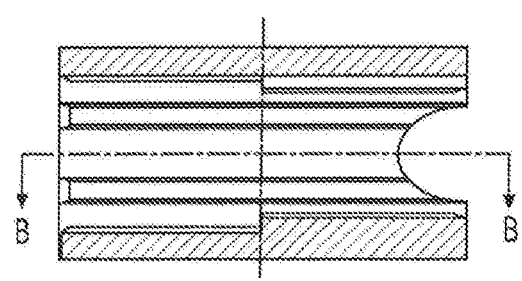
FIG. 4C is a side cross-sectional view of the exemplary shroud of FIG. 1.
Figure 4D:
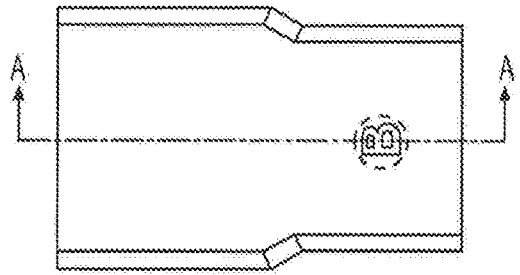
FIG. 4D is a top view of the exemplary shroud of FIG. 1.
Figure 4E:
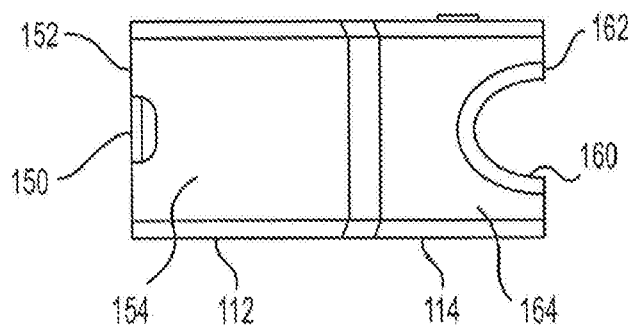
FIG. 4E is a side view of the exemplary shroud of FIG. 1.
Figure 4F:
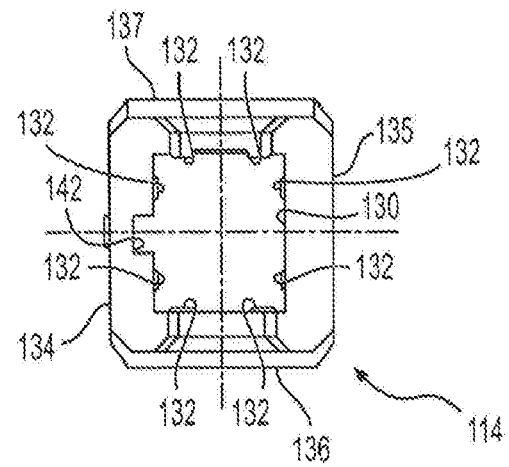
FIG. 4F is a second end view of the exemplary shroud of FIG. 1.
Figure 4G:
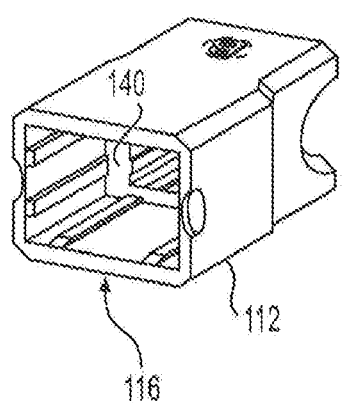
FIG. 4G is a first end perspective view of the exemplary shroud of FIG. 1.
Figure 4H:
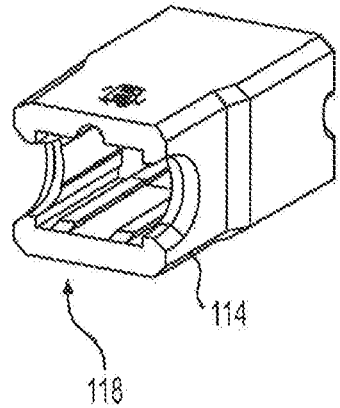
FIG. 4H is a second end perspective view of the exemplary shroud of FIG. 1.

As shown in FIG. 4G, the shroud 100 includes an inner shoulder 140 provided at an interface between the inner surface 120 of the first end portion 112 and the inner surface 130 of the second end portion 114. The inner shoulder 140 is defined by walls that extend from the inner surface 120 of the first end portion 112 to the inner surface 130 of the second end portion 114. The inner shoulder 140 is configured to limit the depth of insertion of the bulkhead adapter 104 into the first end portion 112 of the shroud 100. The depth of insertion may also be limited by flanges 141 extending from opposite sides of the bulkhead adapter 104. The top wall 134 of the inner surface 130 of the second end portion 114 of the shroud 100 includes a notch 142 that extends the length of the second end portion 114. The notch 142 permits passage of a protrusion 144 extending from the outer surface 103 of the top wall 146 of the SC connector 102. As a result, the SC connector 102 can pass through the shroud 100 and be received by a slot 148 in a top wall 149 of the bulkhead adapter 104 for coupling with the bulkhead adapter 104.

Figure 3:
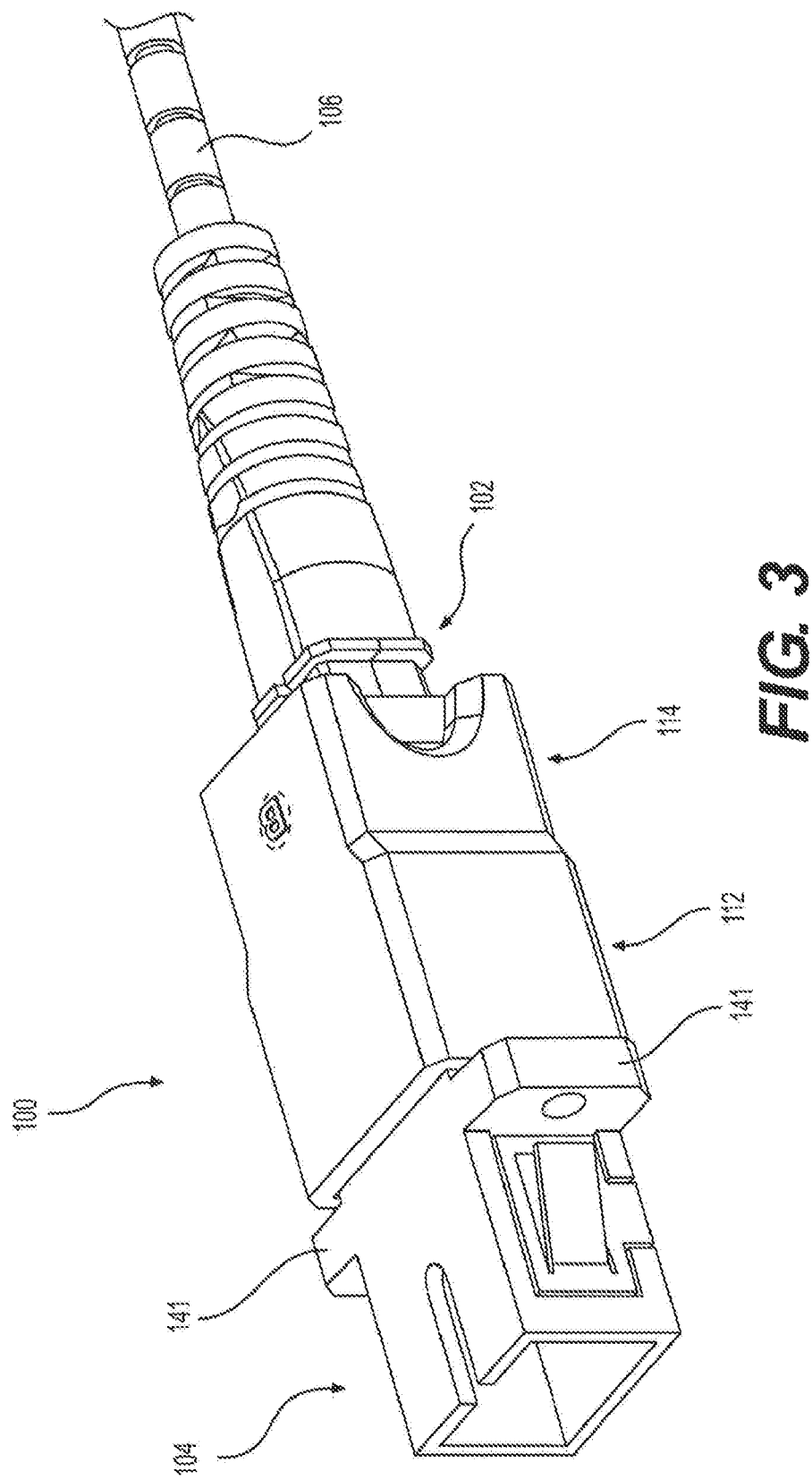
FIG. 3 is a perspective view of the exemplary shroud of FIG. 1 assembled with the exemplary bulkhead adapter and the exemplary SC connector of FIG. 2.

When the shroud 100 is coupled with the SC connector 102 and the bulkhead adapter 104, as illustrated in FIG. 3, the ribs 122 extending from the inner surface 120 of the first end portion 112 of the shroud 100 engage the outer surface 105 of the bulkhead adapter 104 to provide a firm connection between the bulkhead adapter 104 and the shroud 100. Meanwhile, the ribs 132 extending from the inner surface 130 of the second end portion 114 of the shroud 100 engage the outer surface 103 of the SC connector 102 to provide a firm connection between the SC connector 102 and the shroud 100. As a result, the shroud 100 provides a firm connection between the SC connector 102 and the bulkhead adapter 104 that is more firm than a connection between the SC connector 102 and the bulkhead adapter 104 in the absence of the shroud 100.

It should be appreciated that the shroud 100 provides a connection between the SC connector 102 and the bulkhead adapter 104 that is effective is reducing insertion loss when a load is applied to an end of the cable 106, for example, at the boot end of the SC connector. The shroud 100 is effective in providing an insertion loss of less than 0.5 dB when a 1.0 kg, a 1.5 kg, and a 2.0 kg load are applied to the end of the cable, for example, at the boot end of the SC connector, as required to gain Telcordia GR-326 classification.

In some aspects, the shroud 100 may include scalloped notches 150 at the ends 152 of opposing side walls 154 of the first end portion 112 of the shroud 100. The cutouts 150 may correspond with the flanges 141 to accommodate the head of a screw (not shown), which can be used to attach the flanges 141 of the bulkhead adapter 104 to a structure (not shown). The second end portion 114 may include cutouts 160 at the ends 162 of opposing side walls 164 of the second end portion 114 of the shroud 100. The cutouts 160 may permit a user to determine whether the SC connector 102 is properly coupled with the bulkhead adapter 104 based on the portion of the SC connector 102 visible through the cutouts 160. Further, the cutouts 160 may permit a user to grasp the SC connector 102 for engagement and disengagement with the bulkhead adapter 104.

In use, in some aspects, the shroud 100 can be coupled with the bulkhead adapter 104, and then the SC connector 102 can be pushed through the shroud 100 and coupled with the bulkhead adapter 104. Alternatively, in some aspects, the SC connector 102 can first be pushed through the shroud 100. Then, the SC connector 102 can be coupled with the bulkhead adapter 104 and the shroud 100 can subsequently be coupled with the bulkhead adapter 104.

Figure 5A:
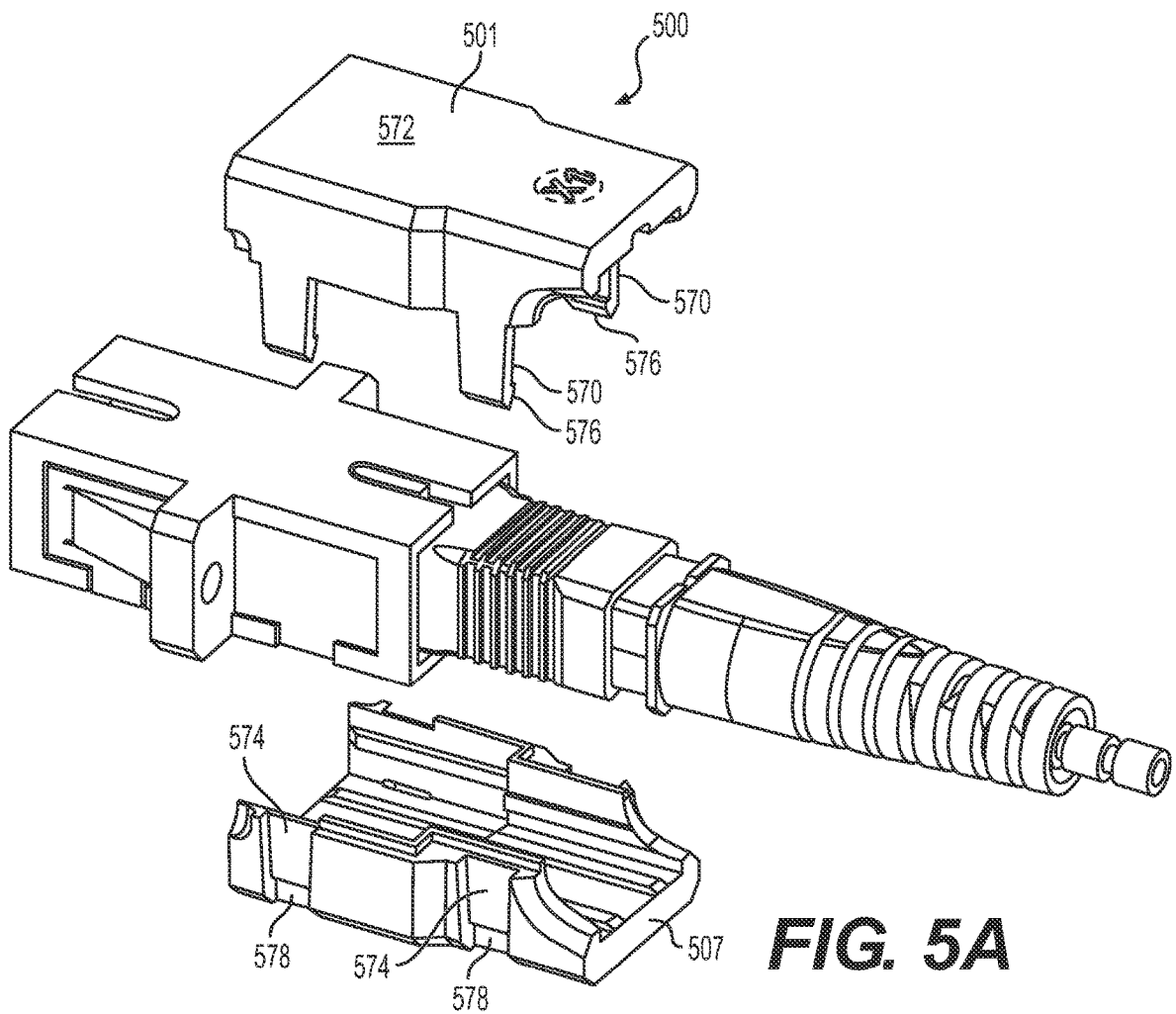
FIG. 5A is an exploded perspective view of another exemplary shroud in accordance with various aspects of the disclosure.
Figure 5B:
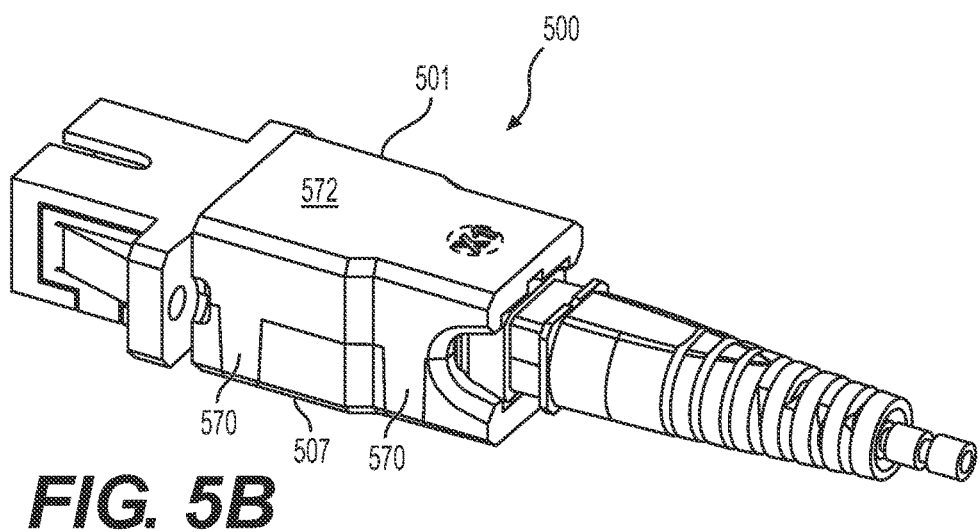
FIG. 5B is a perspective view of the exemplary shroud of FIG. 5A.

Referring now to FIGS. 5A and 5B, an exemplary shroud 500 is substantially the same as the exemplary shroud 100 described above, but the shroud 500 is formed as a two-piece structure. For example, the shroud 500 includes a first shell 501 and a second shell 507 that can be, for example, snap fit together. As shown in FIGS. 5A and 5B, the first shell 501 includes a plurality of fingers 570 that extend from a base 572 of the first shell 501. The second shell 507 includes a plurality of recesses 574 that are each configured to receive one of the fingers 570. In order to secure the first and second shells 501, 507 to one another, each of the fingers 570 may include a lip 576 configured to engage a corresponding shoulder 578 of a respective one of the recesses 574. Otherwise, the shroud 500 includes the above-described features of the shroud 100.

Figure 6A:
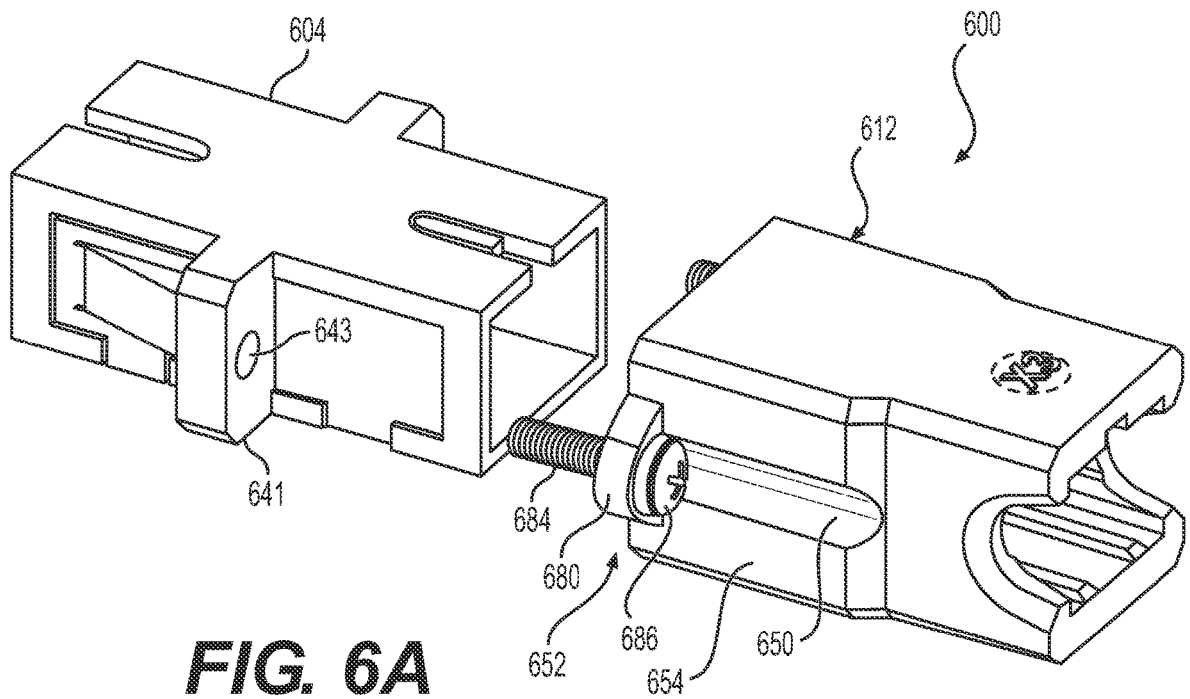
FIG. 6A is a perspective view of another exemplary shroud in accordance with various aspects of the disclosure in an unassembled configuration.
Figure 6B:
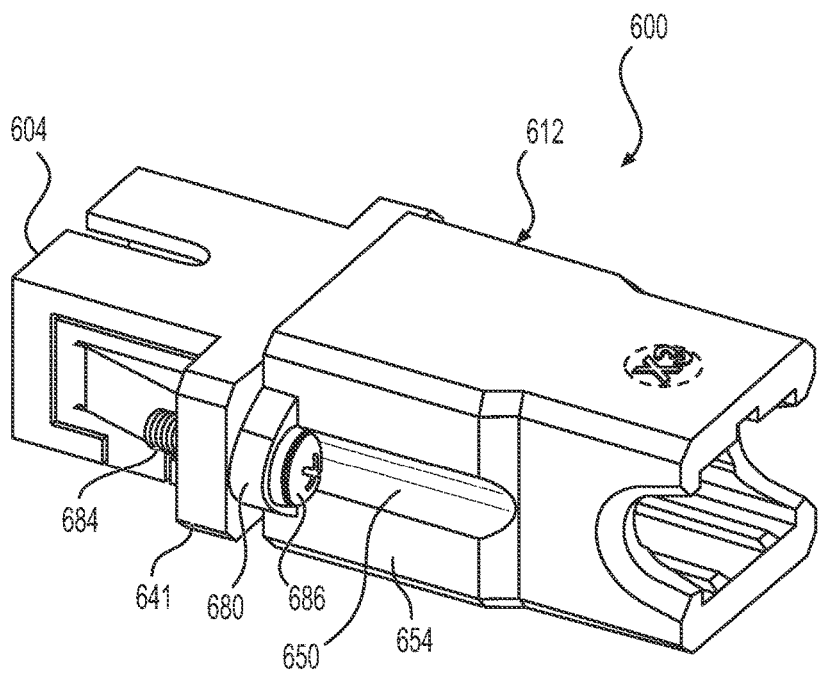
FIG. 6B is a perspective view of the exemplary shroud of FIG. 6A in an assembled configuration.

Referring to FIGS. 6A and 6B, an exemplary shroud 600 is substantially the same as the exemplary shroud 100 described above, but the shroud 600 includes a pair of flanges 680 that extend from ends 652 of opposing side walls 654 of a first end portion 612 of the shroud 600 (only one of the flanges is shown in FIGS. 6A and 6B). Each flange 680 includes a through hole (not visible in FIGS. 6A and 6B) configured to received a fastener 684, such as for example a screw, including but not limited to a machine screw. The through hole of each flange 680 is configured to align with holes 643 in flanges 641 of a bulkhead adapter 604. The fastener 684 is sized to extend through the through hole and the hole 643 and into, for example, a threaded opening (not shown) of a structure (not shown) to which the bulkhead adapter 604 is to be attached. As a result, the shroud 600 is also secured to the structure by the fastener 684. The opposing side walls 654 of the first end portion 612 of the shroud 600 include scalloped notches 650 to accommodate the head 686 of the fastener 684. Otherwise, the shroud 600 includes the above-described features of the shroud 100.

Figure 7A:
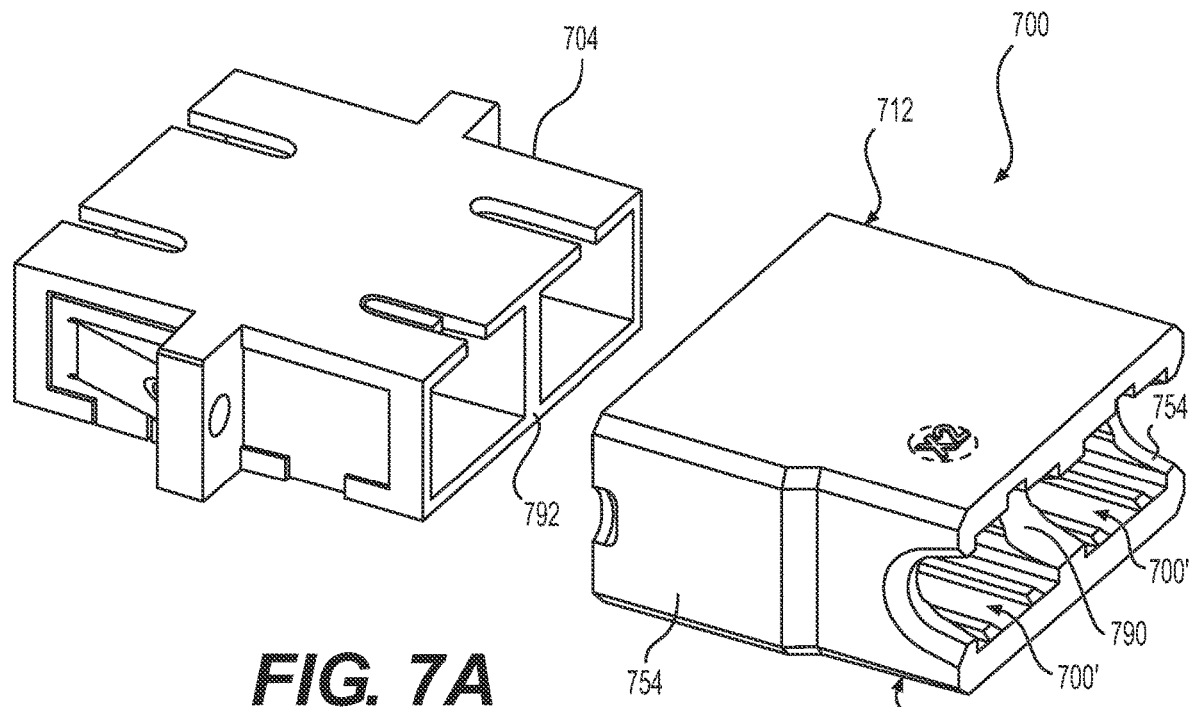
FIG. 7A is a perspective view of another exemplary duplex shroud in accordance with various aspects of the disclosure in an unassembled configuration.
Figure 7B:
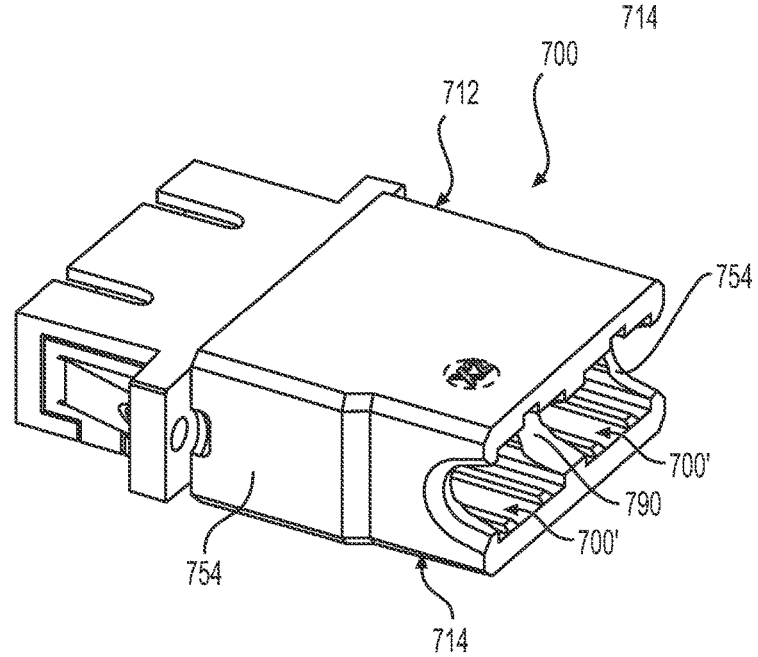
FIG. 7B is a perspective view of the exemplary duplex shroud of FIG. 7A in an assembled configuration.

Referring now to FIGS. 7A and 7B, an exemplary duplex shroud 700 is illustrated. The duplex shroud 700 includes two shroud portions 700' and is effectively the same as two side-by-side shrouds 100 that are formed as a single monolithic piece of unitary construction. In some aspects, the duplex shroud 700 can be formed as a two piece structure that includes two shells, similar to the shroud described above in connection with FIGS. 5A and 5B. The duplex shroud 700 includes a center wall 790 that extends parallel to the opposing side walls 754. However, although not visible in FIGS. 7A and 7B, the center wall 790 can only extend from the second end portion 714 toward the first end portion 712 as far as an inner shoulder (similar to inner should 140, but not visible in FIGS. 7A and 7B) so that the first end portion 712 of the shroud 700 can receive the bulkhead adapter 704, which also includes a center wall 792. Otherwise, the each shroud portion 700' of the shroud 700 includes the above-described features of the shroud 100.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A coupler configured to connect a fiber optic connector with a fiber optic adapter so as to reduce insertion loss when a load is applied to the fiber optic connector, comprising:
   a body portion having a first end portion and a second end portion opposite to the first end portion;
   wherein the first end portion is configured to slidingly receive a fiber optic adapter and engage an outer surface of the fiber optic adapter in an interference fit relationship;
   wherein the second end portion is configured to slidingly receive a fiber optic connector;
   wherein the second end portion includes an inward facing surface configured to engage an outward facing surface of the fiber optic connector in an interference fit relationship;
   wherein the second end portion is configured to include an inner shoulder portion configured to limit a depth of insertion of the fiber optic adapter into the first end portion of the body portion;
   wherein an inward facing surface of a wall of the second end portion of the body portion is configured to include an engagement portion receiving portion therein that extends a length of the second end portion;
   wherein the engagement portion receiving portion being configured to receive and permit passage of an engagement portion extending from an outer surface of a top wall of the fiber optic connector; and
   wherein the body portion is configured to permit the fiber optic connector to be coupled directly with the fiber optic adapter so as to provide a connection between the fiber optic connector and the fiber optic adapter that is configured to reduce insertion loss when a load is applied to an end of the fiber optic connector that is spaced from the body member.

2. The coupler of claim 1,
   wherein the first end portion is configured to include an inner surface having ribs configured to engage the outer surface of the bulkhead adapter in the interference fit relationship, and
   wherein the second end portion is configured to include an inner surface having ribs configured to engage the outer surface of the SC connector in the interference fit relationship.

3. The coupler of claim 1,
   wherein dimensions of an inner surface of the first end portion are greater than corresponding dimensions of an inner surface of the second end portion,
   wherein walls extend from the inner surface of the first end portion to the inner surface of the second end portion define an inner shoulder, and
   wherein the inner shoulder is configured to limit a depth of insertion of the bulkhead adapter into the first end portion of the shroud.

4. The coupler of claim 3,
   wherein the inner shoulder is at an interface between the inner surface of the first end portion and the inner surface of the second end portion.

5. The coupler of claim 1,
   wherein a top wall of the inner surface of the second end portion of the shroud is configured to include a notch that extends a length of the second end portion, notch being configured to receive and permit passage of a protrusion extending from an outer surface of a top wall of the SC connector.

6. The coupler of claim 1,
   wherein the shroud provides an insertion loss of less than 0.5 dB when at least a 1.0 kg load is applied to the end of the cable.

7. The coupler of claim 6,
   wherein the shroud provides an insertion loss of less than 0.5 dB when a 2.0 kg load is applied to the end of the cable.

8. The coupler of claim 1,
   wherein the shroud provides a firm connection between the SC connector and the bulkhead adapter that is more firm that a connection between the SC connector and the bulkhead adapter in the absence of the shroud.

9. The coupler of claim 1,
   wherein the inner surface of the first end portion includes ribs configured to engage the outer surface of the bulkhead adapter in the interference fit relationship, and wherein the inner surface of the second end portion includes ribs configured to engage the outer surface of the SC connector in the interference fit relationship.

10. The coupler of claim 1,
wherein dimensions of an inner surface of the first end portion are greater than corresponding dimensions of an inner surface of the second end portion,
wherein walls extend from the inner surface of the first end portion to the inner surface of the second end portion define an inner shoulder, and
wherein the inner shoulder is configured to limit a depth of insertion of the bulkhead adapter into the first end portion of the shroud.

11. The coupler of claim 10,
wherein the inner shoulder is at an interface between the inner surface of the first end portion and the inner surface of the second end portion.

12. The coupler of claim 1,
wherein a top wall of the inner surface of the second end portion of the shroud is configured to include a notch that extends a length of the second end portion, notch being configured to receive and permit passage of a protrusion extending from an outer surface of a top wall of the SC connector.

13. The coupler of claim 1,
wherein the shroud is configured to provide a connection between the SC connector and the bulkhead adapter that reduces insertion loss when a load is applied to an end of the cable at a boot end of the SC connector.

14. The coupler of claim 13,
wherein the shroud provides an insertion loss of less than 0.5 dB when at least a 1.0 kg load is applied to the end of the cable.

15. The of coupler claim 14,
wherein the shroud provides an insertion loss of less than 0.5 dB when a 2.0 kg load is applied to the end of the cable.

16. The coupler of claim 1,
wherein the shroud provides a firm connection between the SC connector and the bulkhead adapter that is more firm that a connection between the SC connector and the bulkhead adapter in the absence of the shroud.

17. A coupler configured to connect a fiber optic connector with a fiber optic adapter so as to reduce insertion loss when a load is applied to the fiber optic connector, comprising:
a body portion having a first end portion and a second end portion;
wherein the first end portion is configured to receive a fiber optic adapter and engage an outer surface of the fiber optic adapter in an interference fit relationship;
wherein the second end portion is configured to receive a fiber optic connector;
wherein the second end portion includes an inward facing surface configured to engage an outward facing surface of the fiber optic connector in an interference fit relationship;
wherein the second end portion is configured to include an inner shoulder portion configured to limit a depth of insertion of the fiber optic adapter into the first end portion of the body portion; and
wherein the body portion is configured to permit the fiber optic connector to be coupled directly with the fiber optic adapter so as to provide a connection between the fiber optic connector and the fiber optic adapter that is configured to reduce insertion loss when a load is applied to an end of the fiber optic connector that is spaced from the body member.

* * * * *